April 4, 1939. A. BISCH 2,152,679
AMUSEMENT DEVICE
Filed April 2, 1936 3 Sheets-Sheet 2

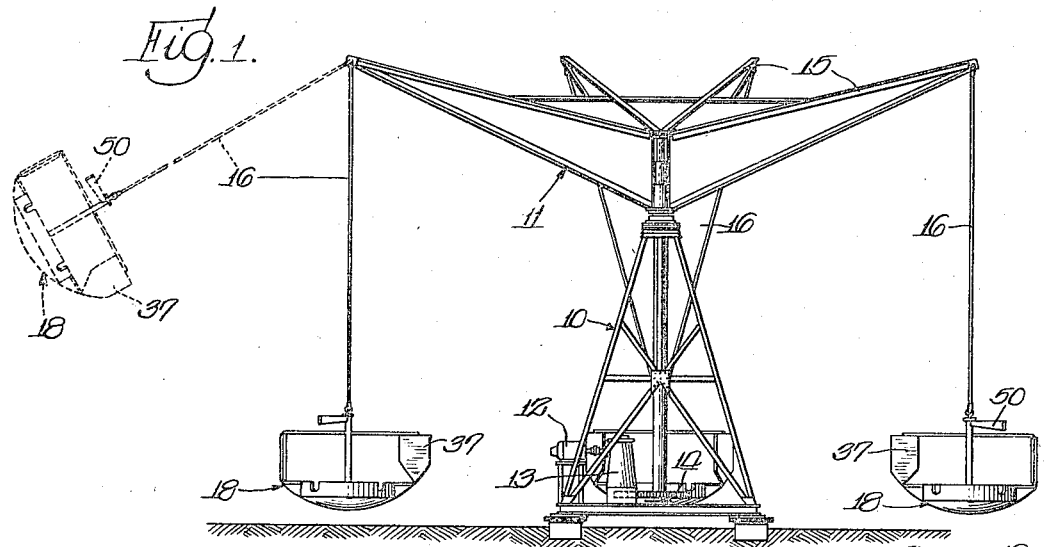
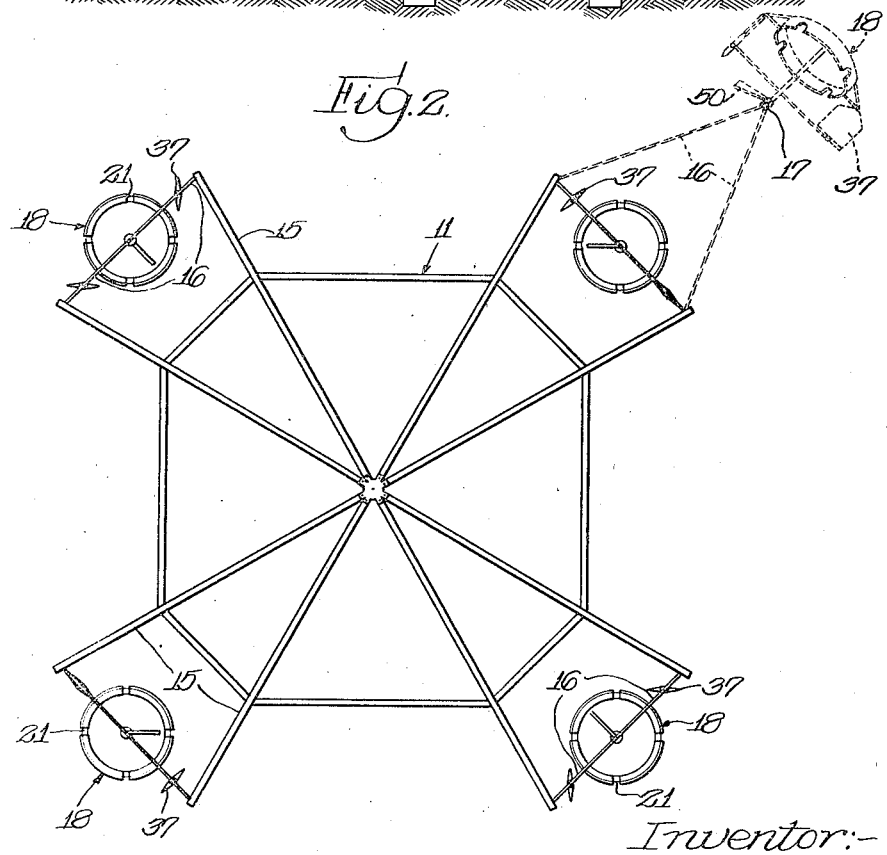

Inventor:-
Alvin Bisch,
By John P. Smith Atty.

April 4, 1939.  A. BISCH  2,152,679
AMUSEMENT DEVICE
Filed April 2, 1936  3 Sheets-Sheet 3
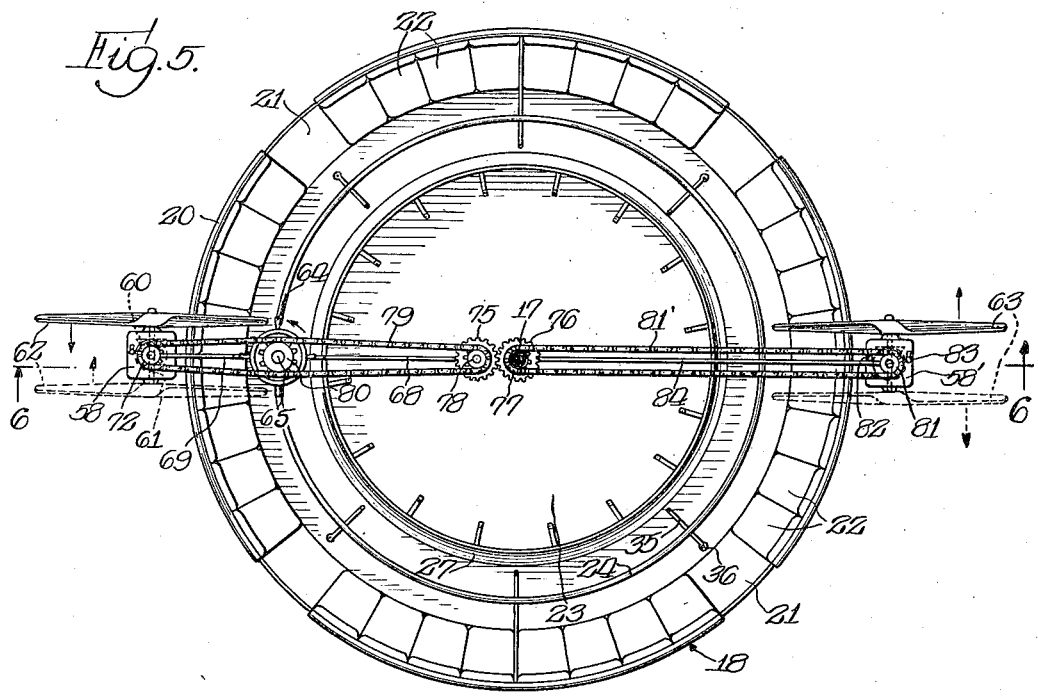
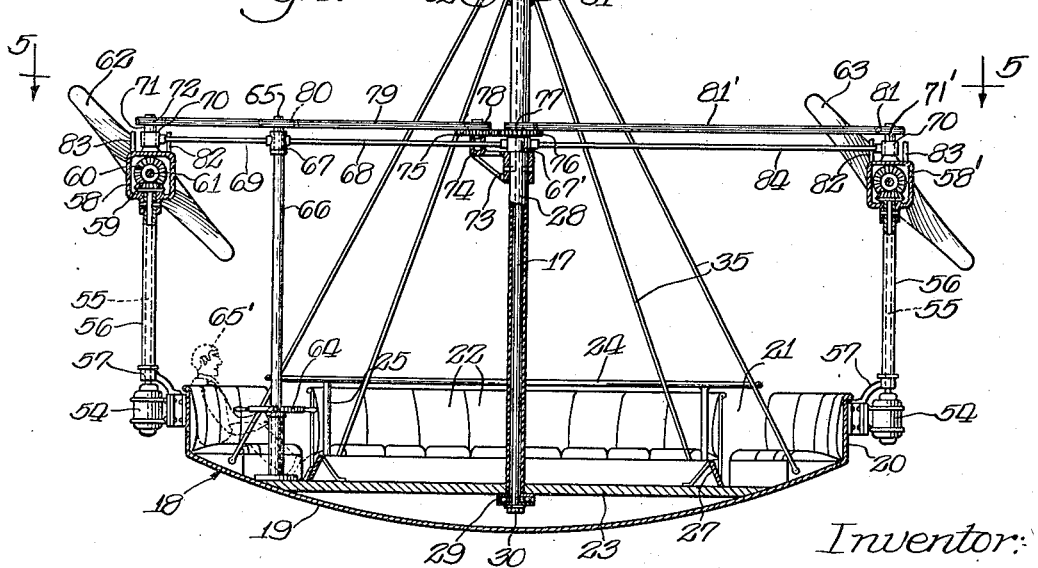
Inventor:
Alvin Bisch,
By John P. Smith Atty.

Patented Apr. 4, 1939

2,152,679

UNITED STATES PATENT OFFICE 2,152,679

AMUSEMENT DEVICE

Alvin Bisch, Chicago, Ill.

Application April 2, 1936, Serial No. 72,241

25 Claims. (Cl. 272—40)

The present invention relates generally to amusement devices, but more particularly to one which is suspended by a cable from a revolving tower supported structure. The passenger carrying device in addition to being revolved about the fixed axis of the tower and swung outwardly therefrom by centrifugally force, is capable of simultaneously rotating or oscillating about its own axis by the action of the wind.

One of the objects of the present invention is to provide a novel and improved amusement device which is adapted to be moved in a variety of directions. The device is actuated in one direction by power and in the other direction by either power or the action of the wind to give the passengers thereof unexpected thrills.

A further object of the invention is to provide a novel and improved amusement device in which a passenger carrying body is adapted to revolve about a fixed axis and simultaneously rotate about its own axis automatically by action of the wind.

A still further object of the invention is to provide a novel and improved amusement device in which a passenger carrying body is suspended by a cable from an overhead revolving structure and in which the body is provided with a wind vane for automatically controlling pivoted wings mounted on the opposite side of the body. This control vane synchronously controls the relative positions of these wings resulting in automatically rotating or oscillating the body about its own axis.

Another object of the invention is to provide a novel and improved amusement device adapted to be revolved about a fixed tower by a suspended cable and in which a passenger carrying body is provided with balanced wings on the opposite sides thereof and operatively connected together and to a centrally located vane which automatically controls the position of the wings with respect to the passenger carrying body for automatically oscillating or rotating the body about its own axis.

A yet further object of the invention is to provide a modified form of the invention in which electric driven propellers are substituted for the automatically controlled wings on the opposite sides of the passenger carrying body. Means are also provided for manually controlling the position of the propellers with respect to the body so that the same in addition to revolving about its overhead structure, is adapted to rotate on the axis of the passenger carrying body and at the same time cause the axis of the passenger carrying body to travel in a path describing substantially the surface of a cone.

These and other objects are accomplished by providing a construction and an arrangement of the various parts in the manner hereinafter described and particularly pointed out in the appended claims.

Referring to the drawings:

Fig. 1 is a side elevational view of my improved amusement device with one of the passenger carrying members removed for the purpose of clearness;

Fig. 2 is a top plan view of the same;

Fig. 5 is a top plan view partly in cross section taken on the line 6—6 in Fig. 6 of the modified form of one of the passenger carrying bodies; and Fig. 6 is a vertical cross sectional view taken on a vertical plane of the device shown in Fig. 5 of the drawings.

Figure 3:
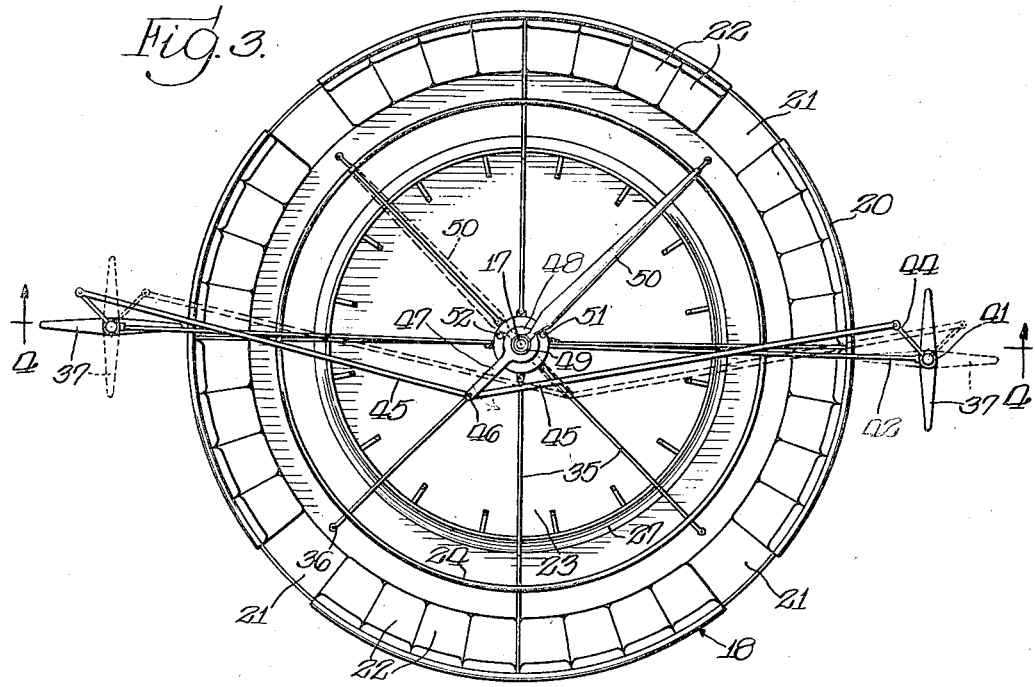
Fig. 3 is a detailed top plan view of one of the passenger carrying bodies.

In illustrating one form of my invention I have shown the same in connection with a more or less conventional form of tower, generally indicated by the reference character 10, having a rotating head or overhead structure generally indicated by the reference character 11. This overhead structure 11 is driven by a motor 12 through a transmission mechanism generally indicated by the reference character 13 which operatively drives a gear 14 for driving the main drive shaft of the rotating head 11. The rotating head 11 in this instance comprises four pairs of diverging arms 15 to the outer end of which are suspended converging cables 16. Connected in any convenient manner to the converging ends of the cables 16 is a shaft 17 on which is revolvably and oscillatably mounted a passenger carrying body generally indicated by the reference character 18. The passenger carrying body 18 comprises a concave metal bottom 19 having vertically extending annular walls 20 extending about the periphery thereof. This wall 20 is omitted at four regular intervals shown at 21 so as to form entrances and exits for the passengers. Arranged between each of these openings 21 are four sections of seats as indicated at 22 so that each body is capable of carrying thirty-two passengers. Mounted in the concave bottom is a flat floor in the form of a steel plate 23 which is rigidly secured to the bottom in any well known manner. Extending around and adjacent the inner edge of the seats is a hand rail 24 which is fastened to the plate 23 by means of vertically extending supporting pipes 25 located at intervals around the body so that each passenger as shown at 26 may grasp the same. Located inwardly of the rail and secured to the plate 23 is a foot rest 27. Secured to the plate 23 is a pipe 28, journaled within which is the shaft 17. Mounted in the lower end of the pipe beneath the plate 23 is an anti-friction bearing 29 which sustains the load of the passenger body. Formed integrally with the lower end of the shaft or threaded thereon is a collar or nut 30 which bears against the lower race of the anti-friction bearing. Secured to the upper end of the pipe 28 is a bearing housing 31 in which is mounted an anti-friction bearing 32. Formed integrally with this housing 31 is a plate 33 which has four laterally projecting ears 34 to which the upper ends of the downwardly diverging cables or rods 35 are connected. The lower ends of these cables are attached as shown at 36 to the concave bottom 19 of the passenger body.

From the above description it will be seen that as the overhead structure 11 revolves about its axis, the centrifugal force will cause the individual passenger carrying bodies to swing outwardly as shown at the dotted lines in Figs. 1 and 2 of the drawings and that by reason of each individual body being journaled on its own vertical axis, it is free to revolve or oscillate with respect thereto.

One of the novel features in connection with my improved amusement device involves an automatically actuated and automatically controlled arrangement for causing each passenger body to rotate or oscillate about its own axis. This feature comprises two oppositely disposed balanced wings, generally indicated by the reference character 37. These wings are secured to shafts 38 which in turn are journaled in bearing brackets 39 secured to the opposite sides of the body on the vertical wall 20 by means of bolts 40. The upper ends of these shafts 38 are journaled in bearings 41 which in turn are secured to the outer ends of brace rods 42. The inner ends of these rods 42 are secured to a bracket 43 which in turn is secured to the vertically extending pipe 28 in the center of the body. Additional braces are provided to rigidly support this structure, but are omitted for the purpose of clearness. Secured to the upper end of each of the shafts 38 above the bearings 41 are crank arms 44. Pivotally connected to the free ends of each of the crank arms 44 are connecting rods 45. The inner ends of these connecting rods 45 are pivotally connected, as shown at 46, to an arm 47 formed integrally with the disc 48 journaled on the shaft 17. This disc is provided with a collar or hub 49 which surrounds the shaft 17 and has secured thereto a laterally projecting wind vane 50. The vane 50 is adapted to swing from its full line position to its dotted line position shown in Fig. 3 and is limited in its movement between these two positions by stops 51 and 52 extending upwardly from the plate 33.

Figure 4:
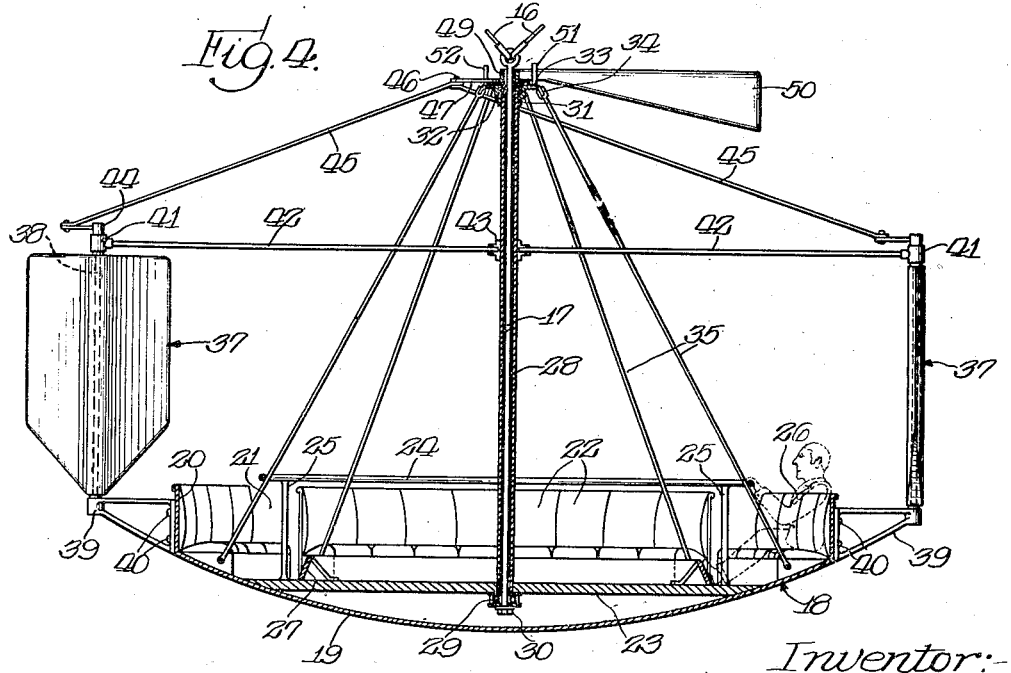
Fig. 4 is a cross sectional view taken on the line 4—4 in Fig. 3.

It will be observed that when one of the wings 37 assumes a plane parallel to a radius passing through the axis of the center of the passenger body and the other wing 37 occupies a plane perpendicular to this same radius as clearly shown in Figs. 3 and 4 of the drawings, but should the wind in the operation of revolving the passenger body around the revolving overhead structure 11 strike the vane 50 so as to actuate the arm 47 to its dotted line position, the wings 37 will assure the dotted line positions shown in Fig. 3, thereby causing the passenger body to continuously rotate about its own axis or to reverse its rotation. In other words, when one of these wings 37 presents its broadside to the wind, then the body will be revolved in that direction causing it to rotate first in one direction and then in the other, depending upon the wind and the position of the wings. In this connection it will be observed that the wings 37 are each balanced or have as much wing surface on one side of their pivots as the other, thereby permitting the relatively small vane 50 to control their positions with respect to their axes. In this connection it will be noted that the wings 37 may assume various angular positions between their full and dotted line positions shown in the drawings. Under such circumstances the position of the wings as well as the direction of the wind will cause a variety of movements through which the passenger body will travel, but in any event the movements or gyrations will be irregular though smooth.

In the modified form of my invention as disclosed in Figs. 5 and 6 of the drawings, I have provided substantially the same revolvable or oscillatable passenger carrying body except that in lieu of the wings I have substituted a right and left hand pitch propeller which are adapted to be manually controlled simultaneously by one of the passengers in the device. In this modified form the parts that are common to both structures, carry the same reference numerals. Secured to the opposite sides of the annular wall 20 are electric motors 54 which are connected to and operatively drive vertically extending shafts 55 which are mounted within tubes 56. The tubes 56 are journaled on brackets 57, which in turn, are secured to the side walls 20. Secured to the upper ends of the tubes 56 are gear housings 58 and 58' in which are mounted beveled gears 59 secured to the upper ends of the shafts 55. Meshing with and operatively driven by the gears 59 are gears 60 which are secured to propeller shafts 61 journaled in the opposite sides of the housings 58 and 58' respectively. Secured to one of the propeller shafts 61 is a right hand propeller blade 62 and to the other shaft is a left hand propeller blade 63 so as to effectively pull or drive the passenger body in the directions indicated by arrows in Fig. 5 of the drawings. In this modified form of my invention I have provided manual means whereby both propellers may be simultaneously moved through an arc of 180° so as to reverse the revolving motion of the passenger carrying body. The propellers may be adjusted with respect to the body so as to divert it off its course and cause it to travel in a more or less irregular path about its axis. When the propellers are adjusted to certain positions the body in addition to revolving on its own axis may have its axis revolve through the surface of substantially a cone, thereby causing the passenger body to travel in a variety of courses during its rotation about the stationary axis of the tower. This manually controlled means comprises a hand operated wheel 64 located in a convenient position to one of the passengers 65' in the passenger body. The wheel 64 is secured to a shaft 65 journaled within a pipe 66. The pipe 66 is secured to a fitting 67 which in turn is braced by a rod 68 to a bracket 67' secured to the main pipe 28. A second rod 69 is connected at one end to the fitting 67 and at its outward end to bearing collar 70 which embraces a stud 71 formed integrally with the housing 58. Rigidly secured to the stud 71 is a sprocket wheel 72, for the purpose hereinafter described. Secured to the pipe 28 is a bracket 73 having an upwardly and laterally extending arm 74. Journaled on the upward end of the bearing arm 74 is a gear 75 which meshes with a gear 76 journaled on the pipe 28 above the bearing bracket 67'. Formed integrally with the gear 76 is a sprocket wheeel 77. Formed integrally with the gear 75 is a sprocket wheel 78. Trained about the sprocket wheel 72 and 78 is a chain 79. The opposite laps of the chain 79 engages the opposite sides of a sprocket 80 secured to the shaft 65. The gear housing 58' on the other side of the passenger body is substantially identical with that on the left side as shown in Fig. 6 and is similarly provided with a sprocket wheel 81 fixed to the stud 71' which in turn is formed integrally with the housing 58'. Trained about the sprocket wheels 81 and 77 is a chain 81'. The propellers are limited in their movements from the full line position shown in Fig. 5 to the dotted line position by vertically extending and upwardly projecting stops 82 and 83 which are adapted to engage a brace rod 84 connecting the bracket 67 with the bearing collar 70.

The operation of my improved amusement device, especially with reference to the modified form shown in Figs. 5 and 6 of the drawings is as follows:

Le us assume that the overhead structure 11 is being revolved so that the passenger carrying bodies swing outwardly so as to assume their dotted line positions shown in Fig. 1 of the drawings and that the propellers assume their full line position shown in Fig. 5 of the drawings with each of the motors 54 in operation. This causes the right and left hand propellers to actuate or propel the passenger body in a direction indicated by the arrows in Fig. 5 causing it to revolve about the axis or shaft 17. Should the operator revolve the hand wheel 64 so as to rotate the sprocket 80 in a direction indicated by the arrow, this in turn will revolve the propeller shaft on the right hand side of Fig. 5 of the drawings in a clock-wise direction and the propeller shaft on the left hand side of Fig. 5 of the drawings in the counter clock-wise direction. If both propellers are operating in a plane at right angles to a radius of the axis of the passenger body, it will cause the body to move outwardly or to the right as viewed in Fig. 5. Upon a further manipulation of the hand wheel 64 so that the propellers assume a slight angle with respect to their former positions, this will cause the axis of the passenger body to describe a path conforming substantially to the surface of a cone while at the same time revolving about the stationary axis of the tower. Obviously by manipulating the controls, a continuously rotating action about the axis of the passenger body may be had or the same may be reversed so as to give an oscillating action affording great thrill and excitement to the passengers in each of the passenger containing bodies.

While in the above specification I have described a preferred embodiment of my invention and one modification thereof, it will of course be understood that other modifications may be made without departing from the spirit and scope of the invention as expressed in the following claims.

What I claim is my invention and desire to secure by Letters Patent is:

1. An amusement device comprising a passenger carrying body freely suspended from a cable, means for revolving said body about a fixed axis, a pair of separate means pivoted to the opposite sides of said body for rotating said body about its own axis, and means for controlling said last named means.

2. An amusement device comprising a passenger carrying body suspended from a cable, means for revolving said body about a fixed axis, and automatically actuated means for oscillating said body about its own axis.

3. An amusement device comprising a passenger carrying body suspended from a cable, means for revolving said body about a fixed axis, and wind actuated means for oscillating said body about its own axis.

4. An amusement device comprising a passenger carrying body suspended from a cable, means for revolving said body about a fixed axis, means for rotating said body about its own axis, and automatically controlled means for changing the direction of rotation of said body about its own axis.

5. An amusement device comprising a passenger carrying body suspended from a cable, means for revolving said body about a fixed axis, means for rotating said body about its own axis, and wind actuated means for automatically controlling the direction of rotation of said body about its own axis.

6. An amusement device comprising a passenger carrying body suspended from a cable, means for revolving said body about a fixed axis, wings pivoted on the opposite sides of said body for rotating said body about its own axis, and means mounted on said body and operatively connected to said wings for simultaneously controlling their position with respect to said body.

7. An amusement device comprising a passenger carrying body suspended from a cable, means for revolving said body about a fixed axis, and a synchronized pair of pivoted wings located on the opposite sides of said body for actuating the same about its own axis.

8. An amusement device comprising a passenger carrying body suspended from a cable, means for revolving said body about a fixed axis, and a pair of balanced pivoted wings located on the opposite sides of said body and operatively connected together for actuating said body about its own axis.

9. An amusement device comprising a passenger carrying body suspended from a cable, means for revolving said body about a fixed axis, a pair of balanced wings pivoted to the opposite sides of said body for actuating said body about its axis, and a wind vane operatively connected to said wings for controlling their positions.

10. An amusement device comprising a passenger carrying body suspended from a cable, means for revolving said body about a fixed axis, and wings pivotally mounted on said body and operatively connected together for rotating said body about its own axis.

11. An amusement device comprising a passenger carrying body suspended from a cable, means for revolving said body about a fixed axis, wings pivotally mounted on said body for rotating said body about its own axis, and means mounted on said body and connected to said wings for automatically controlling the position of said wings with respect to said body.

12. An amusement device comprising a passenger carrying body freely suspended from a cable, means for revolving said body about a fixed axis, and operatively connected means mounted on the opposite sides of said body for rotating said body about an axis ever changing with respect to said fixed axis.

13. An amusement device comprising a tower, a revolving head mounted on said tower, a passenger carrying body freely suspended from said head, means for revolving said head, separate means for revolving said body about its own axis, and means operatively connected to said last named means for controlling the same.

14. An amusement device comprising a passenger carrying body suspended from a cable, means for revolving said body about a fixed axis, and power driven means mounted on said body for rotating the same about its own axis.

15. An amusement device comprising a passenger carrying body suspended from a cable, means for revolving said body about a fixed axis, and a propeller mounted on said body for rotating or oscillating said body about its own axis.

16. An amusement device comprising a passenger carrying body suspended from a cable, means for revolving said body about a fixed axis, power driven means mounted on said body for rotating the same about its own axis, and manually controlled means for changing the relative position of said power driven means with respect to said body.

17. An amusement device comprising a passenger carrying body suspended from a cable, means for revolving said body about a fixed axis, and a plurality of propellers mounted on said body for rotating or oscillating said body about its own axis.

18. An amusement device comprising a passenger carrying body suspended from a cable, means for revolving said body about a fixed axis, and a right and left hand pitch propeller located on the opposite sides of said body for rotating or oscillating said body about its own axis.

19. An amusement device comprising a passenger carrying body suspended from a cable, means for revolving said body about a fixed axis, a right and left hand pitch propeller mounted on said body for simultaneously actuating said body in the same direction, and manually controlled means for simultaneously adjusting the position of both of said propellers with respect to said body.

20. An amusement device comprising a passenger carrying body sustained from a cable, means for revolving said body about a fixed axis, a propeller mounted on said body for rotating or oscillating said body around its own axis, and means for adjusting the position of said propeller with respect to said body.

21. An amusement device comprising a passenger carrying body sustained from a cable, means for revolving said body about a fixed axis, a plurality of propellers mounted on said body for rotating or oscillating said body with respect to its own axis, and means for changing the position of said propellers with respect to said body.

22. An amusement device comprising a passenger carrying body suspended from a revolving structure, means for revolving said body about a fixed axis, and operatively connected means mounted on the opposite portions of said body for oscillating said body about an axis everchanging with respect to said fixed axis.

23. An amusement device comprising a passenger carrying body suspended from a revolving structure, means for revolving said body about a fixed axis, operatively connected means mounted on the opposite portions of said body for oscillating said body about an axis everchanging with respect to said fixed axis, and means for controlling said first named means.

24. An amusement device comprising a tower, a revolving head mounted on said tower, a passenger carrying body freely suspended from said head, means for revolving said head, separate means for oscillating said body about its own axis, and means operatively connected to said last named means for controlling the same.

25. An amusement device comprising a passenger carrying body suspended from a revolving structure, means for revolving said body about a fixed axis, and a synchronized pair of wings located on the opposite portions of said body for oscillating the same about its own axis.

ALVIN BISCH.